United States Patent
Okubo

(10) Patent No.: US 10,106,067 B2
(45) Date of Patent: Oct. 23, 2018

(54) VEHICLE SEAT DEVICE

(71) Applicant: TS TECH CO., LTD, Asaka-shi, Saitama (JP)

(72) Inventor: Takuya Okubo, Tochigi (JP)

(73) Assignee: T.S. Tech Co., Ltd., Saitama (JP)

( * ) Notice: Subject to any disclaimer, the term of this patent is extended or adjusted under 35 U.S.C. 154(b) by 83 days.

(21) Appl. No.: 15/334,685

(22) Filed: Oct. 26, 2016

(65) Prior Publication Data

US 2017/0043692 A1     Feb. 16, 2017

Related U.S. Application Data

(62) Division of application No. 14/345,450, filed as application No. PCT/JP2012/074344 on Sep. 24, 2012, now Pat. No. 9,511,695.

(30) Foreign Application Priority Data

Sep. 25, 2011   (JP) .................................. 2011-208309

(51) Int. Cl.

| | |
|---|---|
| *B60N 2/806* | (2018.01) |
| *B60N 2/70* | (2006.01) |
| *F16F 7/108* | (2006.01) |
| *B60N 2/64* | (2006.01) |
| *B60N 2/809* | (2018.01) |
| *B60N 2/80* | (2018.01) |

(52) U.S. Cl.
CPC ............. *B60N 2/806* (2018.02); *B60N 2/64* (2013.01); *B60N 2/7017* (2013.01); *B60N 2/80* (2018.02); *B60N 2/809* (2018.02); *F16F 7/108* (2013.01); *B60N 2002/899* (2018.02); *B60N 2205/20* (2013.01)

(58) Field of Classification Search
CPC ................................. B60N 2/888; B60N 2/809
See application file for complete search history.

(56) References Cited

U.S. PATENT DOCUMENTS

| | | | |
|---|---|---|---|
| 5,934,750 A * | 8/1999 | Fohl ....................... | B60N 2/888 |
| | | | 297/216.12 |
| 8,210,608 B2 | 7/2012 | Igarashi et al. | |
| | (Continued) | | |

FOREIGN PATENT DOCUMENTS

| | | |
|---|---|---|
| CN | 101542160 A | 9/2009 |
| JP | 60-151135 A | 8/1985 |
| | (Continued) | |

*Primary Examiner* — Timothy J Brindley
(74) *Attorney, Agent, or Firm* — Carrier Blackman & Associates, P.C.; William D. Blackman; Joseph P. Carrier

(57) ABSTRACT

A vehicle seat device includes a seat cushion disposed on a floor of a vehicle, a seat back linked to a rear end part of the seat cushion, and a headrest fitted to an upper end part of the seat back, wherein a vibration system that also includes the seat back and the headrest is equipped with a dynamic damper. The dynamic damper includes an elastic member that is embedded within a cushion member of the vibration system, and a weight embedded in the elastic member. The weight has a center of gravity thereof set to a position offset to at least one side from a center of the cushion member in an up-and-down direction of a seat, and the weight has an asymmetric shape in at least one of a lateral direction and an up-and-down direction.

9 Claims, 10 Drawing Sheets

(56) References Cited

U.S. PATENT DOCUMENTS

| | | | |
|---|---|---|---|
| 8,590,966 B2 | 11/2013 | Gaines et al. | |
| 9,403,451 B2 * | 8/2016 | Munemura | B60N 2/888 |
| 9,452,697 B2 * | 9/2016 | Okubo | B60N 2/44 |
| 2009/0038726 A1 * | 2/2009 | Yukawa | B60C 19/002 |
| | | | 152/454 |
| 2012/0086255 A1 | 4/2012 | Ishimoto et al. | |
| 2012/0098316 A1 | 4/2012 | Matsushima et al. | |
| 2013/0113179 A1 * | 5/2013 | O'Sullivan | A61G 5/10 |
| | | | 280/293 |

FOREIGN PATENT DOCUMENTS

| | | |
|---|---|---|
| JP | H10-226255 A | 8/1998 |
| JP | 2001-161489 A | 6/2001 |
| JP | 2007-029600 A | 2/2007 |
| JP | 2008-296732 A | 12/2008 |
| JP | 2010-194246 A | 9/2010 |
| JP | 2010-201848 A | 9/2010 |
| WO | WO 2011/0142679 | * 11/2011 |

* cited by examiner

VEHICLE SEAT DEVICE

CROSS-REFERENCE TO RELATED APPLICATIONS

This application is a divisional of U.S. application Ser. No. 14/345,450, filed Mar. 18, 2014, which is the US National Phase of PCT/JP2012/074344 filed Sep. 24, 2012, which claims priority under 35 USC § 119 based on Japanese patent application No. 2011-208309, filed on Sep. 25, 2011. The subject matter of these priority documents are incorporated by reference herein in their entirety.

TECHNICAL FIELD

The present invention relates to an improvement of a vehicle seat device that includes a seat cushion disposed on a floor of a vehicle, a seat back linked to a rear end part of the seat cushion, and a headrest fitted to an upper end part of the seat back, the seat provided with a vibration system that includes the seat back and the headrest being equipped with a dynamic damper.

BACKGROUND ART

The dynamic damper in such a vehicle seat device exhibits a damping action of suppressing vibration in the fore-and-aft direction and/or in the left-and-right direction of the seat back and headrest while the vehicle is traveling, and such a vehicle seat device is known, as disclosed in Japanese Patent Application Laid-open No. 10-226255.

SUMMARY OF THE INVENTION

Problems to be Solved by the Invention

Conventionally, in such a vehicle seat device, since the dynamic damper is formed from a plurality of coil springs, a bracket, a weight held by the bracket, and retaining means that connects the coil springs to a frame of the vibration system and the bracket, the number of components is large and the structure is complicated.

The present invention has been accomplished in light of such circumstances, and it is an object thereof to provide a vehicle seat device that includes a dynamic damper having a small number of components and a simple structure.

Means for Solving the Problems

In order to attain the above object, according to a first aspect of the present invention, there is provided a vehicle seat device comprising a seat cushion disposed on a floor of a vehicle, a seat back linked to a rear end part of the seat cushion, and a headrest fitted to an upper end part of the seat back, a vibration system comprising the seat back and the headrest being equipped with a dynamic damper, characterized in that the dynamic damper comprises an elastic member that is embedded or wrapped around within a cushion member of the vibration system and is formed from a rubber or elastomer that is softer than the cushion member, and a weight embedded or wrapped around in the elastic member. It should be noted here that the frame of the vibration system corresponds to a seat back frame 10 and a headrest frame 12 of an embodiment of the present invention, which is described later, and the cushion member of the vibration system corresponds to a cushion member 38 of a seat back 3 and a cushion member 13 of a headrest 4.

Further, according to a second aspect of the present invention, in addition to the first aspect, the dynamic damper is disposed so that part of the cushion member is present between the elastic member and a frame of the vibration system.

Furthermore, according to a third aspect of the present invention, in addition to the second aspect, the dynamic damper is embedded in the cushion member of the headrest so that the center of gravity of the weight of the dynamic damper is present above a center in an up-and-down direction of the headrest.

Moreover, according to a fourth aspect of the present invention, in addition to any one of the first to third aspects, the headrest comprises a headrest frame that is supported on a support tube so that the headrest frame can move up and down and be fixed, the support tube being fixedly provided on an upper end part of a seat back frame of the seat back, and the cushion member that is supported on the headrest frame, and the dynamic damper is embedded in the cushion member so that when viewed from a side the weight is present on an extension axis of the support tube.

Further, according to a fifth aspect of the present invention, in addition to any one of the first to fourth aspects, the headrest comprises a headrest frame and the cushion member, the headrest frame is formed from a frame lower portion supported on the support tube so that the frame lower portion can move up and down and be fixed, the support tube being fixedly provided on an upper end part of a seat back frame of the seat back, and a frame upper portion bending forward from an upper end of the frame lower portion and extending obliquely upward, the cushion member is supported on the frame upper portion, and the dynamic damper is embedded in the cushion member so as to be positioned to the rear of the frame upper portion.

Furthermore, according to a sixth aspect of the present invention, in addition to the first or second aspect, the dynamic damper is embedded as a pair in left and right shoulder parts of the cushion member of the seat back.

Moreover, according to a seventh aspect of the present invention, in addition to any one of the first to sixth aspects, the weight of the dynamic damper is formed so that an upper half portion of the weight has a mass that is larger than a mass of a lower half portion.

Further, according to an eighth aspect of the present invention, in addition to any one of the first to seventh aspects, the elastic member of the dynamic damper is formed so that a spring constant thereof varies between that when the weight vibrates in a fore-and-aft direction of the vehicle and that when the weight vibrates in a left-and-right direction of the vehicle.

Furthermore, according to a ninth aspect of the present invention, there is provided a vehicle seat device comprising a seat cushion disposed on a floor of a vehicle, a seat back linked to a rear end part of the seat cushion, and a headrest fitted to an upper end part of the seat back, a vibration system comprising the seat back and the headrest being equipped with a dynamic damper, characterized in that the dynamic damper comprises an elastic member that is supported on a headrest frame of the headrest so as to wrap around the headrest frame and is formed from a rubber or elastomer that is softer than a cushion member of the seat back, and a weight embedded or wrapped around in the elastic member.

Effects of the Invention

In accordance with the first aspect of the present invention, since the dynamic damper is formed from the elastic member that is embedded or wrapped around within the cushion member of the vibration system and is formed from a rubber or an elastomer that is softer than the cushion member, and the weight embedded or wrapped around in this elastic member, simply embedding or wrapping the elastic member having the weight embedded or wrapped around therein within the cushion member of the vibration system enables the dynamic damper to be easily mounted on the vibration system, that is, the headrest or the seat back, it is therefore unnecessary to use a plurality of coil springs, spring retaining means, a bracket for holding a weight, etc. as is conventional, and a vehicle seat device equipped with a dynamic damper having a small number of components and a simple structure can be provided at low cost.

In accordance with the second aspect of the present invention, since the dynamic damper is disposed so that part of the cushion member of the vibration system is present between the elastic member of the dynamic damper and the frame of the vibration system, it is possible to prevent the elastic member from coming into contact with the frame of the vibration system, thus making the dynamic damper exhibit a good damping function.

In accordance with the third aspect of the present invention, since the dynamic damper is embedded in the cushion member of the headrest so that the center of gravity of the weight is present above the center in the vertical direction of the headrest, the center of gravity of the weight is present at a position that is in effect the furthest from the part of the vibration system that is supported on the seat cushion, therefore making it possible to impart to the dynamic damper a predetermined damping function by means of a weight having a relatively small mass and thereby contributing to lightening the weight of the vehicle seat device.

In accordance with the fourth aspect of the present invention, since the dynamic damper is disposed so that when viewed from the side the weight thereof is present on the extension axis of the support tube of the seat back frame, which supports the headrest frame so that it can move up and down and be fixed, it is possible for the damping action of the dynamic damper to be exerted on the seat back frame efficiently, thus damping the vibration system effectively.

In accordance with the fifth aspect of the present invention, since the dynamic damper is disposed to the rear of the frame upper portion, which extends upward while bending forward from the upper end of the frame lower portion of the headrest frame, it is possible to efficiently dispose the headrest frame and the dynamic damper in a thickness range that is limited in the fore-and-aft direction of the cushion member of the headrest, thereby avoiding an increase in size of the headrest.

In accordance with the sixth aspect of the present invention, the pair of dynamic dampers embedded in the left and right shoulder parts of the cushion member of the seat back enable vibration of the vibration system that includes the seat back and the headrest to be suppressed. Moreover, since the dynamic dampers, which are divided into a pair, are individually compact, they can be embedded compactly in the two shoulder parts of the seat back so as not to affect the comfort of a seated driver.

In accordance with the seventh aspect of the present invention, the center of gravity of the weight is present at a position above the center in the vertical direction of the weight, and the center of gravity of the weight is accordingly further away than the part of the vibration system that is supported on the seat cushion, therefore making it possible to impart to the dynamic damper a predetermined damping function by means of a weight having a relatively small mass and thereby contributing to lightening the weight of the vehicle seat device.

In accordance with the eighth aspect of the present invention, when the natural frequency of the dynamic damper varies between that when it is vibrated in the left-and-right direction and that when it is vibrated in the fore-and-aft direction, making the vibration direction and natural frequency correspond to the direction and frequency of vibration transmitted from the floor to the vibration system via the seat cushion enables the vibration system to be damped effectively.

In accordance with the ninth aspect of the present invention, vibration of the vibration system that includes the seat back and the headrest can be suppressed by means of resonance vibration of the weight accompanied by elastic vibration of the elastic member. Moreover, the elastic member of the dynamic damper also functions as a cushion member of the headrest, the number of components can be cut accordingly, and the structure can be simplified.

EXPLANATION OF REFERENCE NUMERALS AND SYMBOLS

Figure 1:
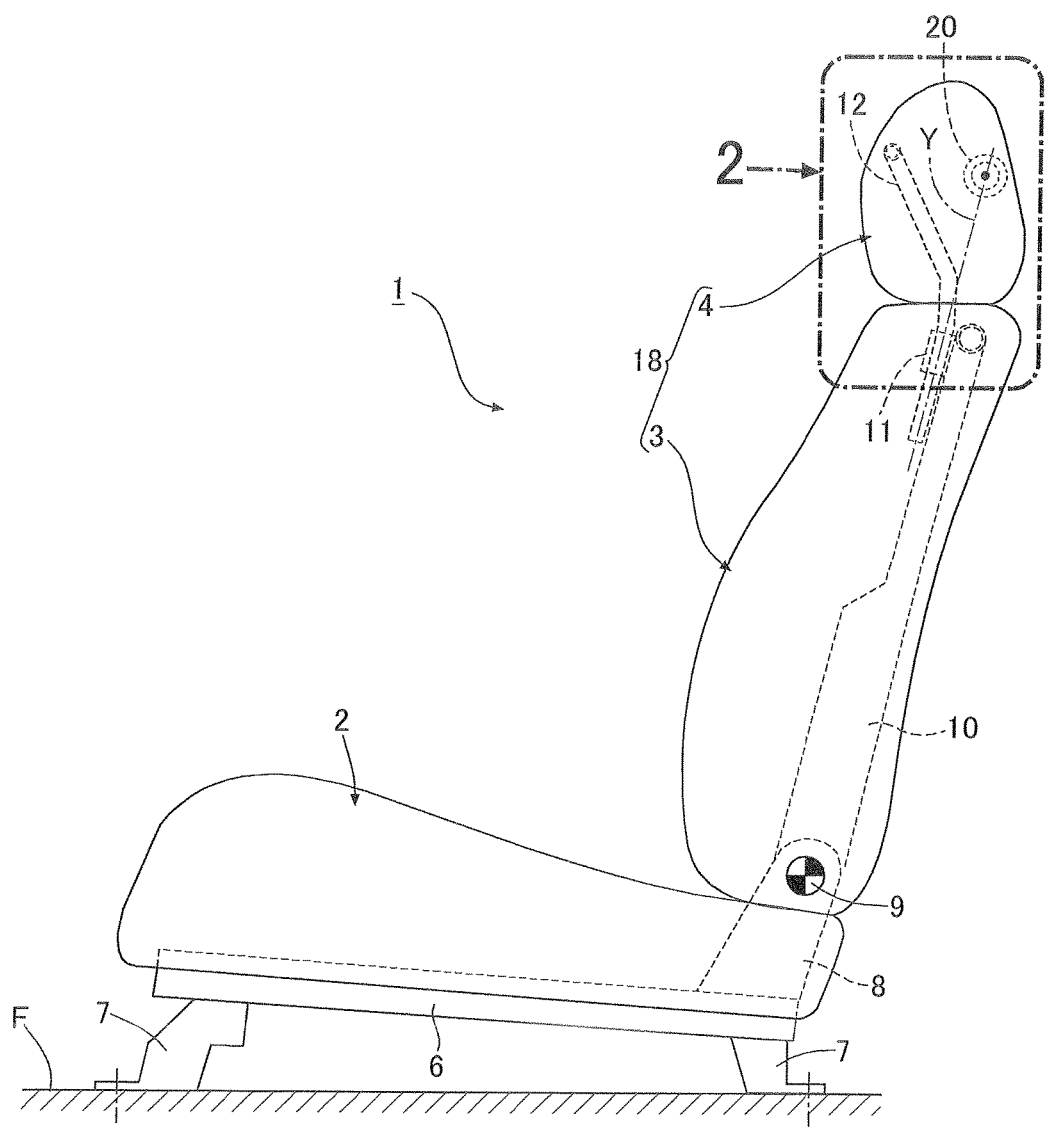
FIG. 1 is a side view of a vehicle seat device related to a first embodiment of the present invention. (first embodiment)

2 Seat cushion
3 Seat back
4 Headrest
6 Seat cushion frame
10 Seat back frame
11 Support tube
12 Headrest frame
13 Cushion member of headrest
15a Frame lower portion
15b Frame upper portion
18 Vibration system
20 Dynamic damper
21 Elastic member
22 Weight
38 Cushion member of seat back
F Floor
G Center of gravity of weight S1 Center in vertical direction of weight
Y Extension axis of support tube

MODES FOR CARRYING OUT THE INVENTION

A first embodiment of the present invention shown in FIG. 1 to FIG. 4 is now explained.

First Embodiment

In FIG. 1, a seat 1 for a vehicle is formed from a seat cushion 2, a seat back 3, and a headrest 4. The seat cushion 2 has a seat cushion frame 6 having a plurality of support legs 7 and 7 formed in its lower part, and the support legs 7 and 7 are secured to a floor F of the vehicle.

A left and right pair of brackets 8 protruding upward are provided so as to be connected to a rear end part of the seat cushion frame 6, and a seat back frame 10 of the seat back 3 is linked to these brackets 8 via a pivot shaft 9 in a reclinable manner.

Furthermore, a pair of left and right support tubes 11 and 11 are fixedly provided on an upper end part of the seat back frame 10, and these support tubes 11 and 11 support the headrest 4 so that it can move up and down and be fixed.

Figure 2:
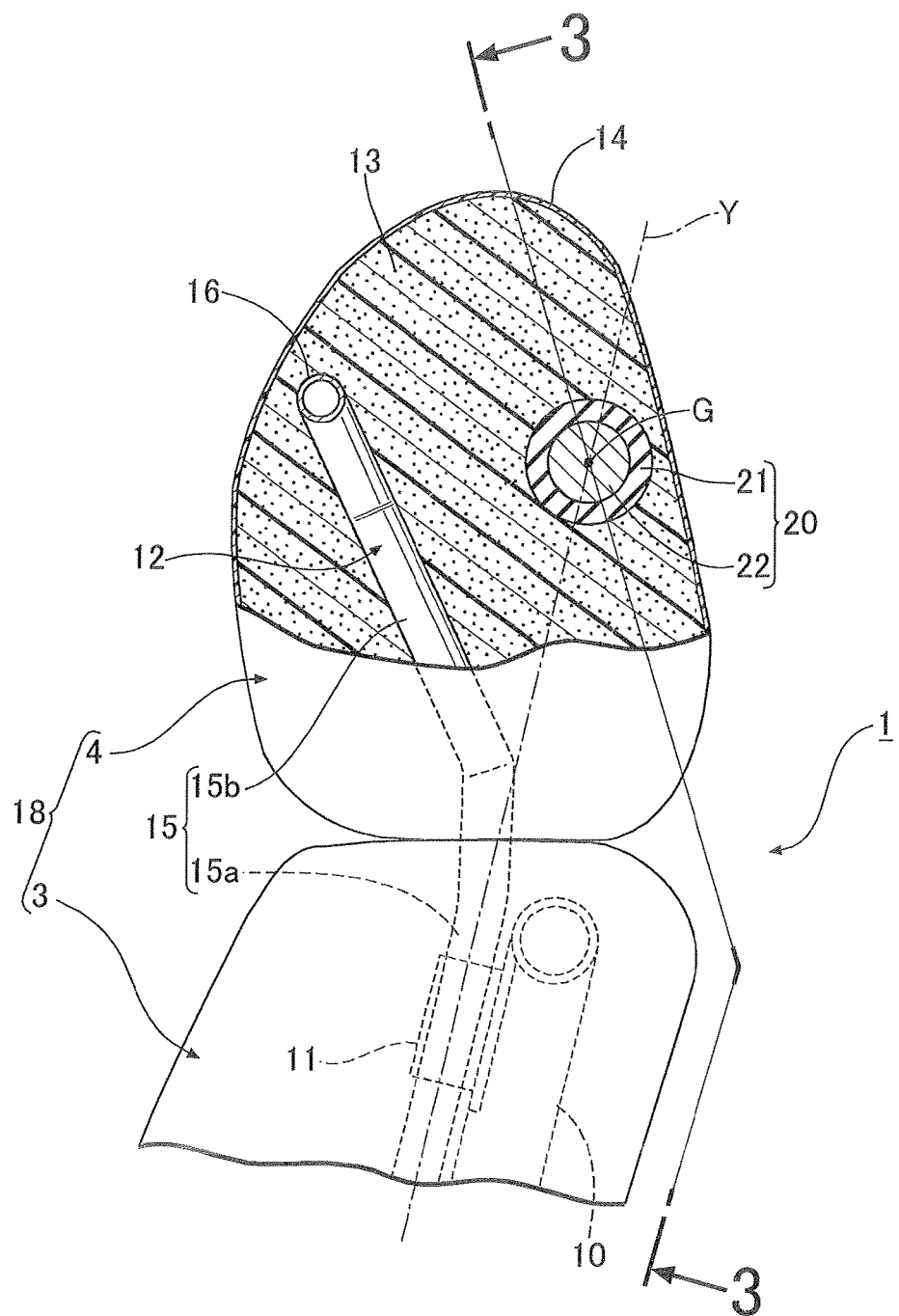
FIG. 2 is an enlarged view of part 2 in FIG. 1. (first embodiment)
Figure 3:
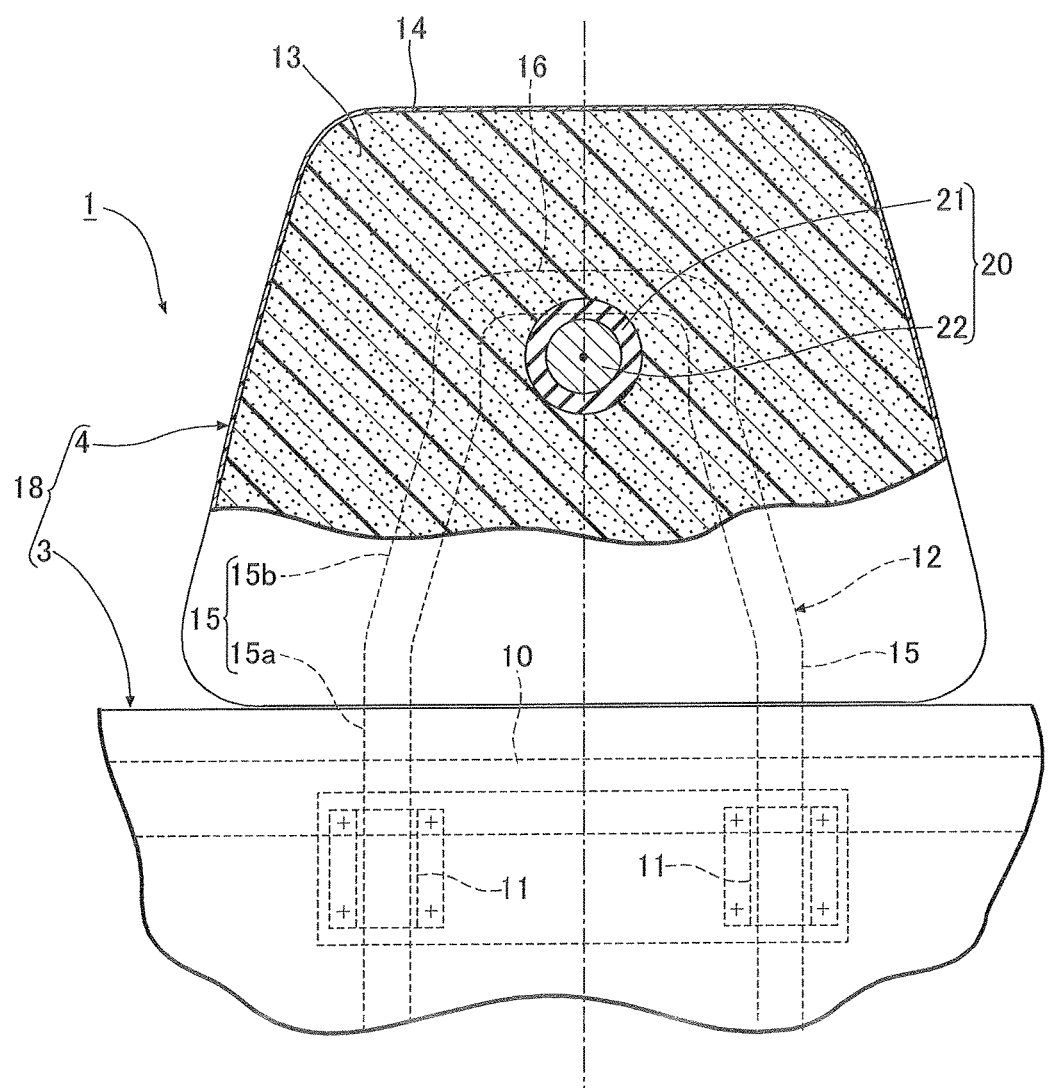
FIG. 3 is a sectional view along line 3-3 in FIG. 2. (first embodiment)

As shown in FIG. 2 and FIG. 3, the headrest 4 is formed from a headrest frame 12, a cushion member 13 that is made of a urethane foam and is supported on the headrest frame 12, and a skin 14 covering the surface of the cushion member 13.

The headrest frame 12 is formed from a pair of left and right rod parts 15 and 15 supported by the pair of support tubes 11 and 11, and a linking part 16 integrally linking upper ends of these rod parts 15 and 15, and has a gate shape when viewed from the front. Furthermore, the left and right rod parts 15 and 15 are formed from a frame lower portion 15a supported by the support tubes 11 and 11 and extending upward and a frame upper portion 15b extending upward to the linking part 16 while bending forward from the upper end of the frame lower portion 15a, the frame upper portion 15b and the linking part 16 being embedded in the cushion member 13 to thus support the cushion member 13.

Thus, the seat back 3 and the headrest 4 form a continuous vibration system 18 linked to the seat cushion frame 6 via the pivot shaft 9, and in order to suppress vibration of the vibration system 18 a dynamic damper 20 is provided within the headrest 4.

The dynamic damper 20 is formed from an elastic member 21, which is embedded in the cushion member 13 of the headrest 4, and a weight 22 embedded in the elastic member 21, the elastic member 21 being made of a rubber or elastomer that is softer than the cushion member 13, and the weight 22 being made of a metal.

When this dynamic damper 20 is embedded in the cushion member 13, the dynamic damper 20 is disposed to the rear of the frame upper portion 15b.

Furthermore, the dynamic damper 20 is disposed so that part of the cushion member 13 is present between the elastic member 21 and the headrest frame 12.

Moreover, the dynamic damper 20 is disposed so that the center of gravity G of the weight 22 is above a center S1 in the vertical direction of the headrest 4.

Furthermore, the dynamic damper 20 is disposed so that when viewed from the side the weight 22 thereof is present on an extension axis Y of the support tube 11.

Moreover, the dynamic damper 20 is disposed so that part thereof protrudes upward from the upper end of the headrest frame 12.

Figure 4:
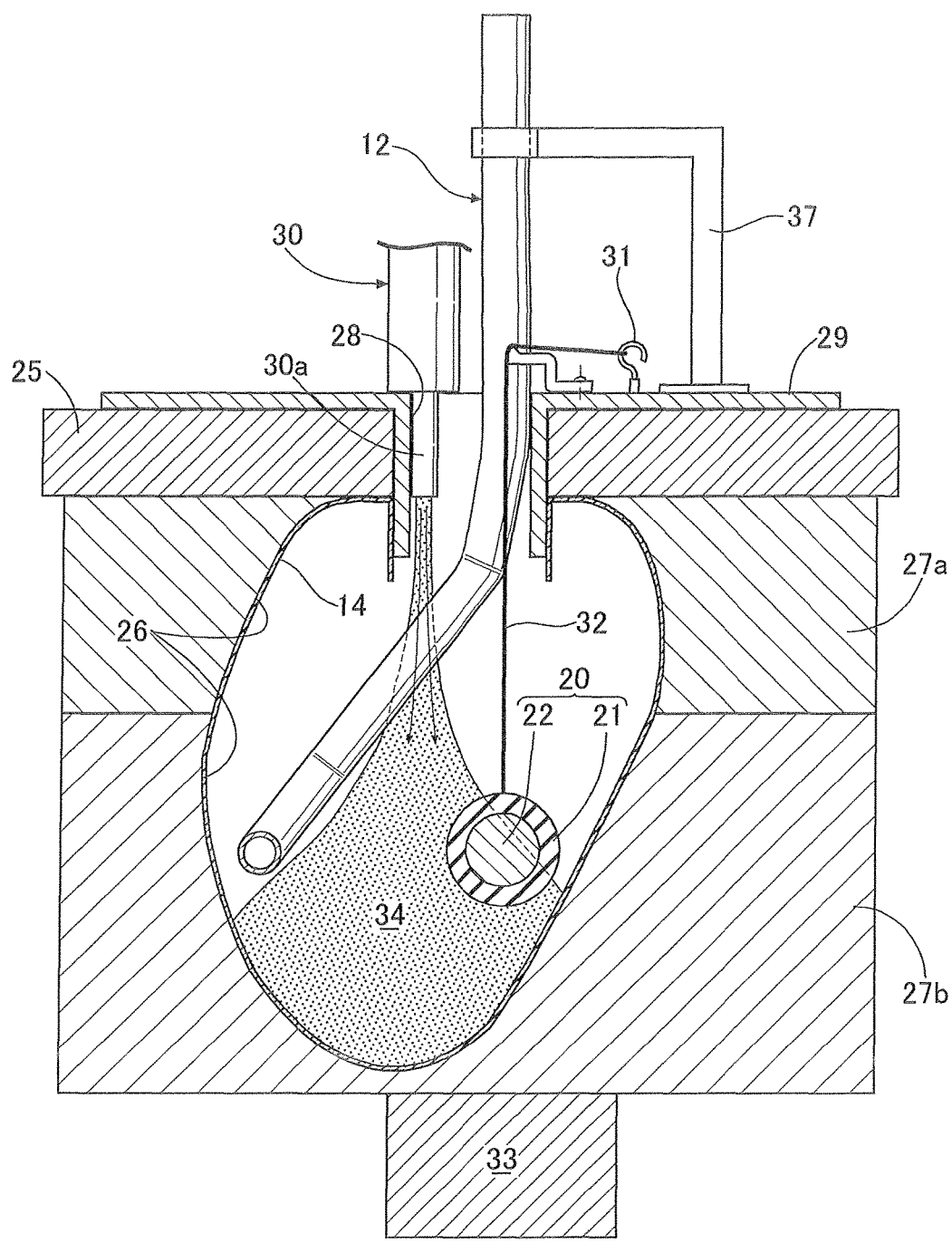
FIG. 4 is a diagram for explaining a method of producing a headrest equipped with a dynamic damper. (first embodiment)

A method of embedding the dynamic damper 20 in the headrest 4 is explained by reference to FIG. 4.

Attached to a lower face of a machine platform 25 are molding dies 27a and 27b, which form a cavity 26 corresponding to the external shape of the headrest 4 excluding the headrest frame 12 and can be opened and closed in the vertical direction, and provided in advance on an inner face of the cavity 26 so as to be stretched over it is the skin 14 of the headrest 4. Furthermore, a support plate 29 having a foam material injection opening 28 that opens in the cavity 26 is fixed to an upper face of the molding platform 25, and a foam material supply device 30 having its nozzle 30a facing the foam material injection opening 28 is mounted on the support plate 29. Moreover, the headrest frame 12, which is disposed within the cavity 26 through the foam material injection opening 28, is supported by a bracket 37 provided on the support plate 29. Furthermore, the dynamic damper 20 is connected to a thread 32 retained on a hook 31 on the support plate 29, and the dynamic damper 20 is suspended at a predetermined position within the cavity 26 through the foam material injection opening 28. In this case, the weight 22 of the dynamic damper 20 is made of iron, and a magnet 33 for imparting to the weight 22 an attractive force so as to stabilize the dynamic damper 20 at the predetermined position is attached to the lower molding die 27b. The molding dies 27a and 27b are made of a non-magnetic synthetic resin so that they do not interfere with the magnetic action of the magnet 33 on the weight 22.

Thus, a foam material 34 such as a urethane is injected into the interior of the skin 14, which is bag shaped and in intimate contact with the inner face of the cavity 26, through the nozzle 30a of the foam material supply device 30 and is made to foam, thus forming the cushion member 13 that wraps around the headrest frame 12 and the dynamic damper 20 within the skin 14. The headrest 4 thus produced can be taken out from the dies by opening the molding dies 27a and 27b in the vertical direction.

The operation of the first embodiment is now explained.

While the vehicle is traveling, in the dynamic damper 20, the weight 22 undergoes resonant vibration accompanied by elastic vibration of the elastic member 21 to thus provide alternative absorption of the vibrational energy of the vibration system 18, when it is transmitted to the vibration system 18 from the floor F of the vehicle via the seat cushion 2 and the pivot shaft 9, and it is thus possible to damp the vibration system 18, that is, the seat back 3 and the headrest 4.

Moreover, since the dynamic damper 20 is formed from the elastic member 21, which is embedded within the cushion member 13 of the headrest 4 and made of a rubber material that is softer than the cushion member 13, and the weight 22, which is embedded in the elastic member 21, simply embedding the elastic member 21 having the weight 22 embedded therein within the cushion member 13 enables the dynamic damper 20 to be mounted easily on the headrest 4. That is, it is unnecessary to use a plurality of coil springs, spring retaining means, a bracket for holding a weight, etc. as is conventional, and a vehicle seat device equipped with the dynamic damper 20 having a small number of components and a simple structure can be provided at low cost.

Furthermore, since the dynamic damper 20 is disposed to the rear of the frame upper portion 15b, which extends upward while bending forward from the upper end of the frame lower portion 15a of the headrest frame 12, it is possible to efficiently dispose the headrest frame 12 and the dynamic damper 20 in a thickness range that is limited in the fore-and-aft direction of the cushion member 13 of the headrest 4, thereby avoiding an increase in size of the headrest 4.

Furthermore, since the dynamic damper 20 is disposed so that part of the cushion member 13 is present between the elastic member 21 of the dynamic damper 20 and the headrest frame 12, it is possible to prevent the elastic member 21 from coming into contact with the headrest frame 12, thus making the dynamic damper 20 exhibit a good damping function.

Moreover, since the dynamic damper 20 is disposed so that the center of gravity G of the weight 22 is present above the center S1 in the vertical direction of the headrest 4, the center of gravity G of the weight 22 is present at a position that is in effect the furthest from the point of the vibration system supported on the seat cushion 2, therefore making it possible to impart to the dynamic damper 20 a damping function by means of the weight 22 having a relatively small mass and thereby contributing to lightening the weight of the vehicle seat device.

Furthermore, since the dynamic damper 20 is disposed so that when viewed from the side the weight 22 thereof is present on the extension axis Y of the support tube 11 of the seat back frame 10, which supports the headrest frame 12 so that it can move up and down and be fixed, it is possible for the damping action of the dynamic damper 20 to be exerted on the seat back frame 10 efficiently, thus damping the vibration system 18 effectively.

Figure 5:
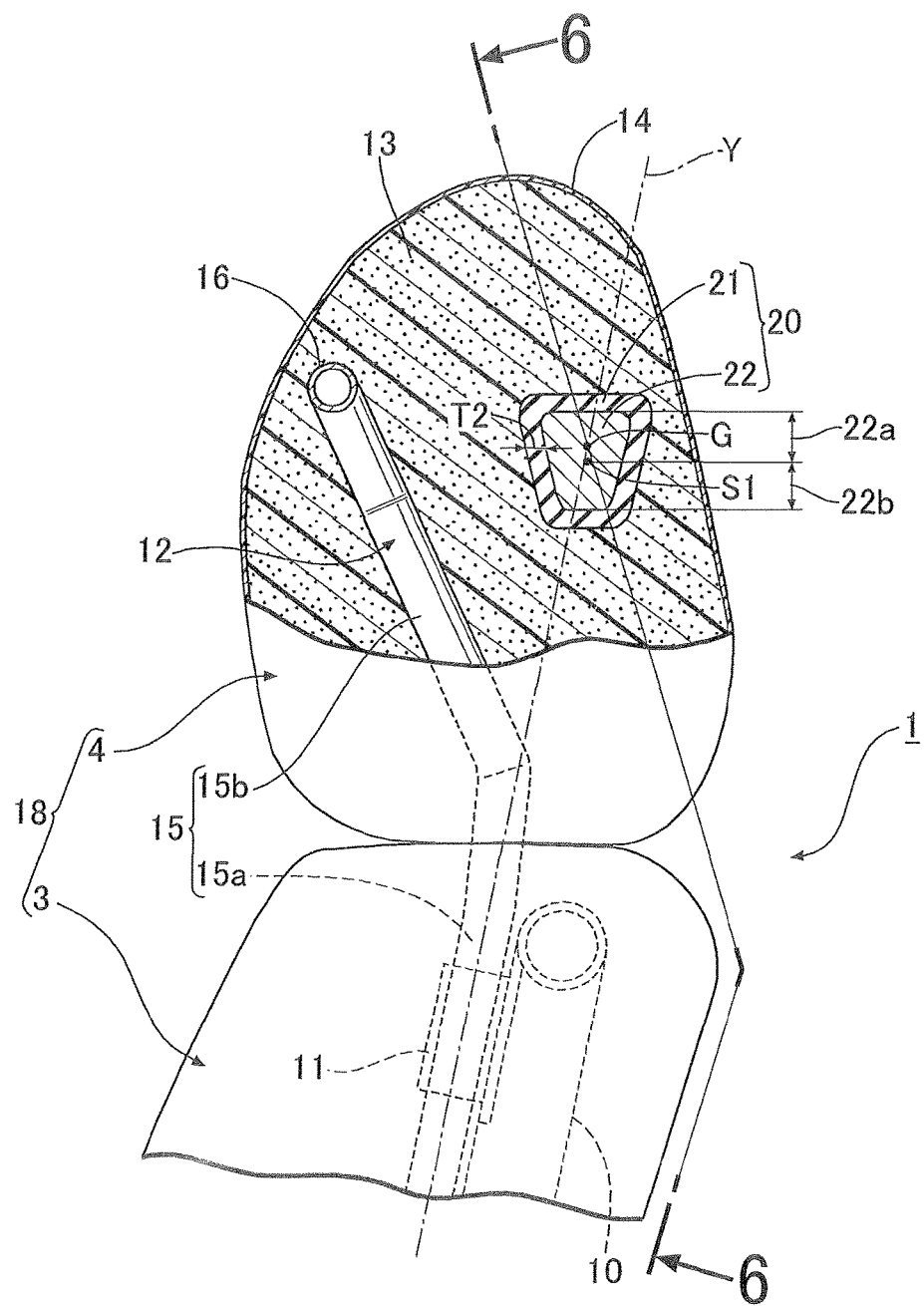
FIG. 5 is a view, corresponding to FIG. 2, of a second embodiment of the present invention. (second embodiment)
Figure 6:
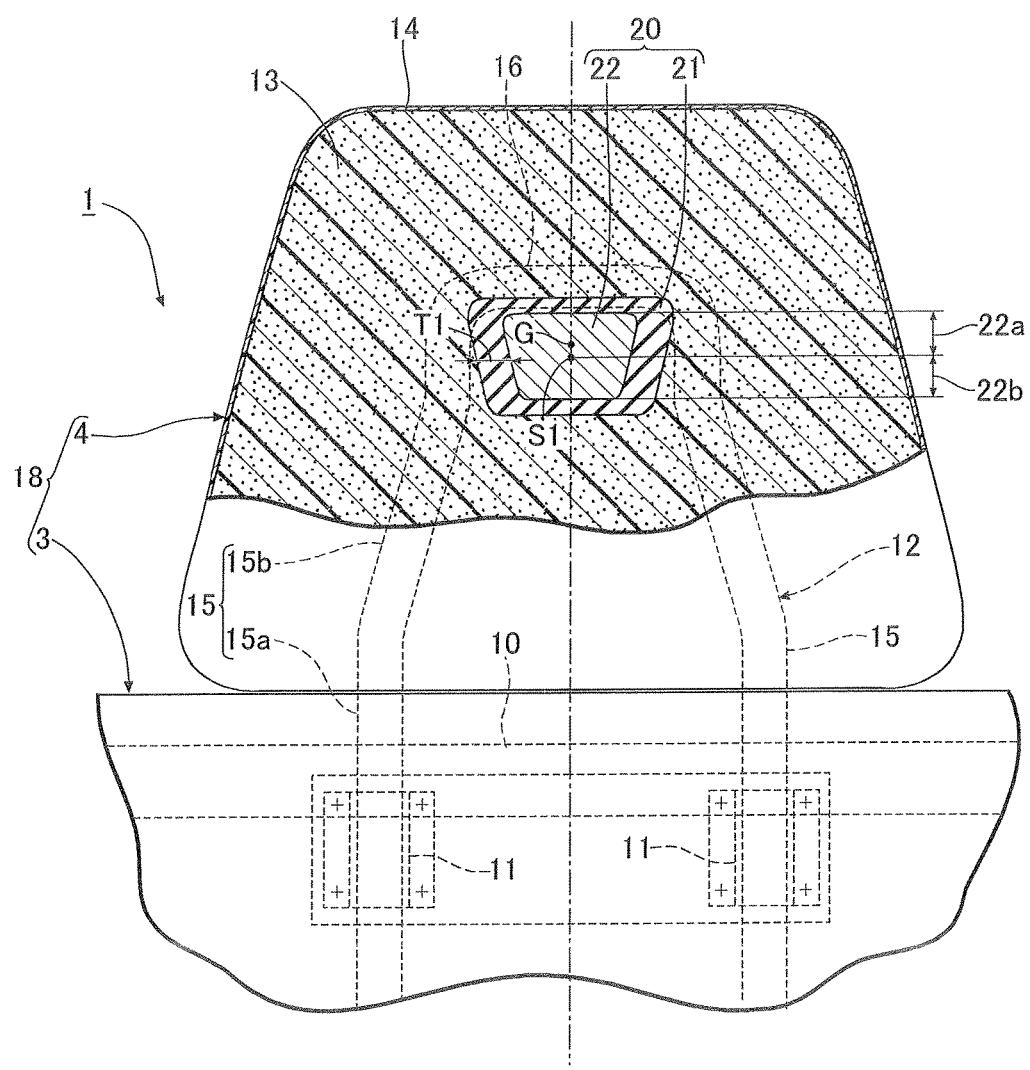
FIG. 6 is a sectional view along line 6-6 in FIG. 5. (second embodiment)

A second embodiment of the present invention shown in FIG. 5 and FIG. 6 is now explained.

Second Embodiment

In this second embodiment, a weight 22 of a dynamic damper 20 is formed so that the mass of its upper half portion is larger than the mass of its lower half portion. Specifically, the weight 22 is formed in a reverse trapezoidal shape when viewed from the side. By so doing, the center of gravity G of the weight 22 is present at a position above a center S2 in the vertical direction of the weight 22, and the center of gravity G of the weight 22 is correspondingly further away from the part of the vibration system that is supported on a seat cushion 2, therefore making it possible to impart to the dynamic damper 20 a damping function by means of the weight 22 having a relatively small mass and thereby contributing to lightening the weight of the vehicle seat device.

Furthermore, an elastic member 21, which houses the weight 22 in its interior, is formed so that its spring constant when receiving a load in the left-and-right direction from the weight 22 is different from its spring constant when receiving a load in the fore-and-aft direction. By so doing, when the natural frequency of the dynamic damper 20 varies between that when it is vibrated in the left-and-right direction and that when it is vibrated in the fore-and-aft direction, making the vibration direction and natural frequency correspond to the direction and frequency of vibration transmitted from a floor F to a vibration system 18 via the seat cushion 2 enables the vibration system 18 to be damped effectively.

In order to make the spring constant of the elastic member 21 when receiving a load in the left-and-right direction from the weight 22 be different from a spring constant when receiving a load in the fore-and-aft direction, in the illustrated example the elastic member 21 is formed so as to have a thickness T1 in the left-and-right direction and a thickness T2 in the fore-and-aft direction that are different from each other. For example, it is formed so that the thickness T1 in the left-and-right direction is larger than the thickness T2 in the fore-and-aft direction. Changing the thickness of the elastic member 21 in this way so as to impart directionality to the spring constant as described above is effective in simplifying the structure.

Furthermore, the same effect may be obtained by forming a portion of the elastic member 21 that receives a load in the left-and-right direction from the weight 22 and a portion that receives a load in the fore-and-aft direction from the weight 22 from rubber materials having different Young's moduli.

The arrangement is otherwise the same as that of the first embodiment; parts in FIG. 5 and FIG. 6 corresponding to those in the first embodiment are denoted by the same reference numerals and symbols, and duplication of the explanation is omitted.

Figure 7:
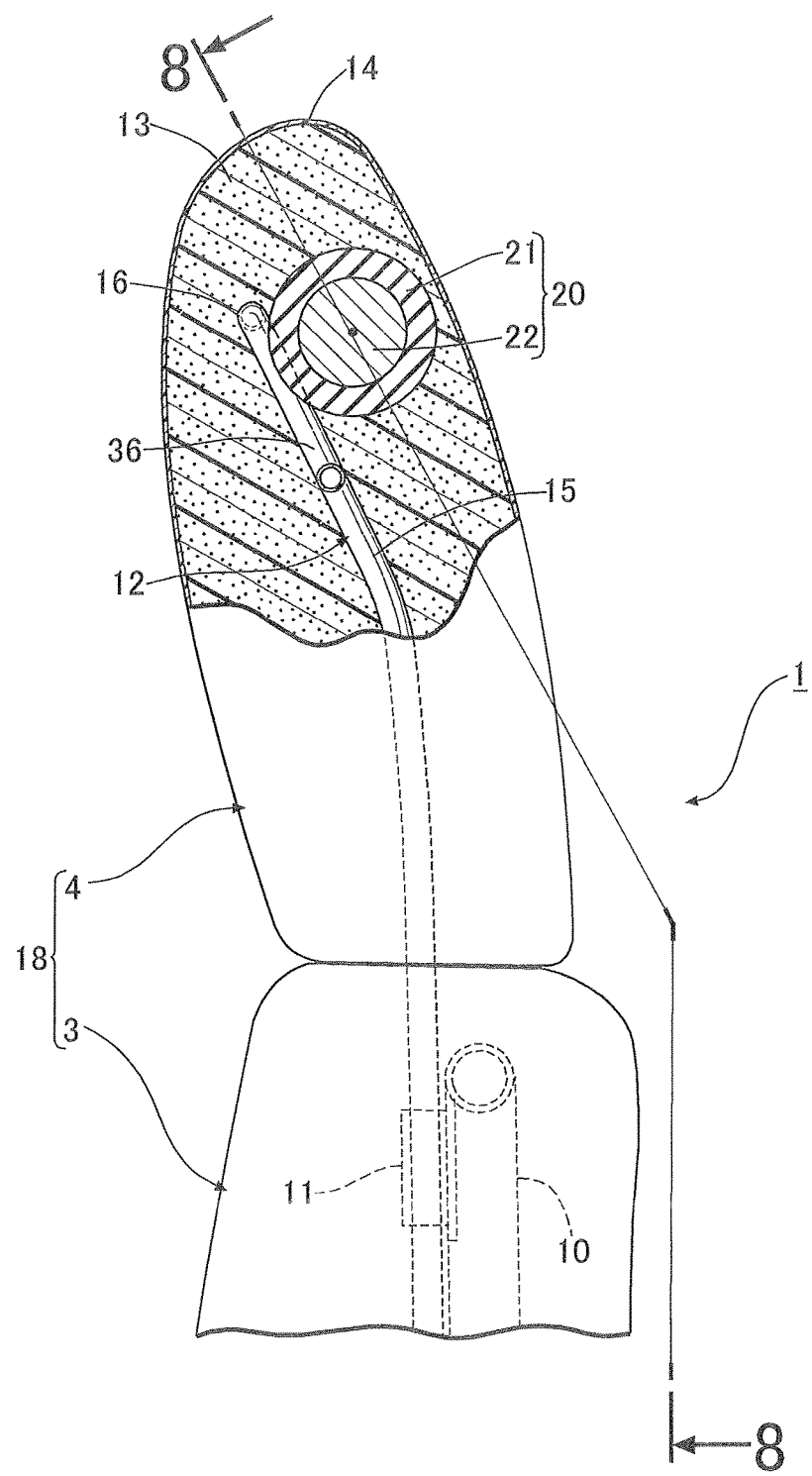
FIG. 7 is a view, corresponding to FIG. 2, of a third embodiment of the present invention. (third embodiment)
Figure 8:
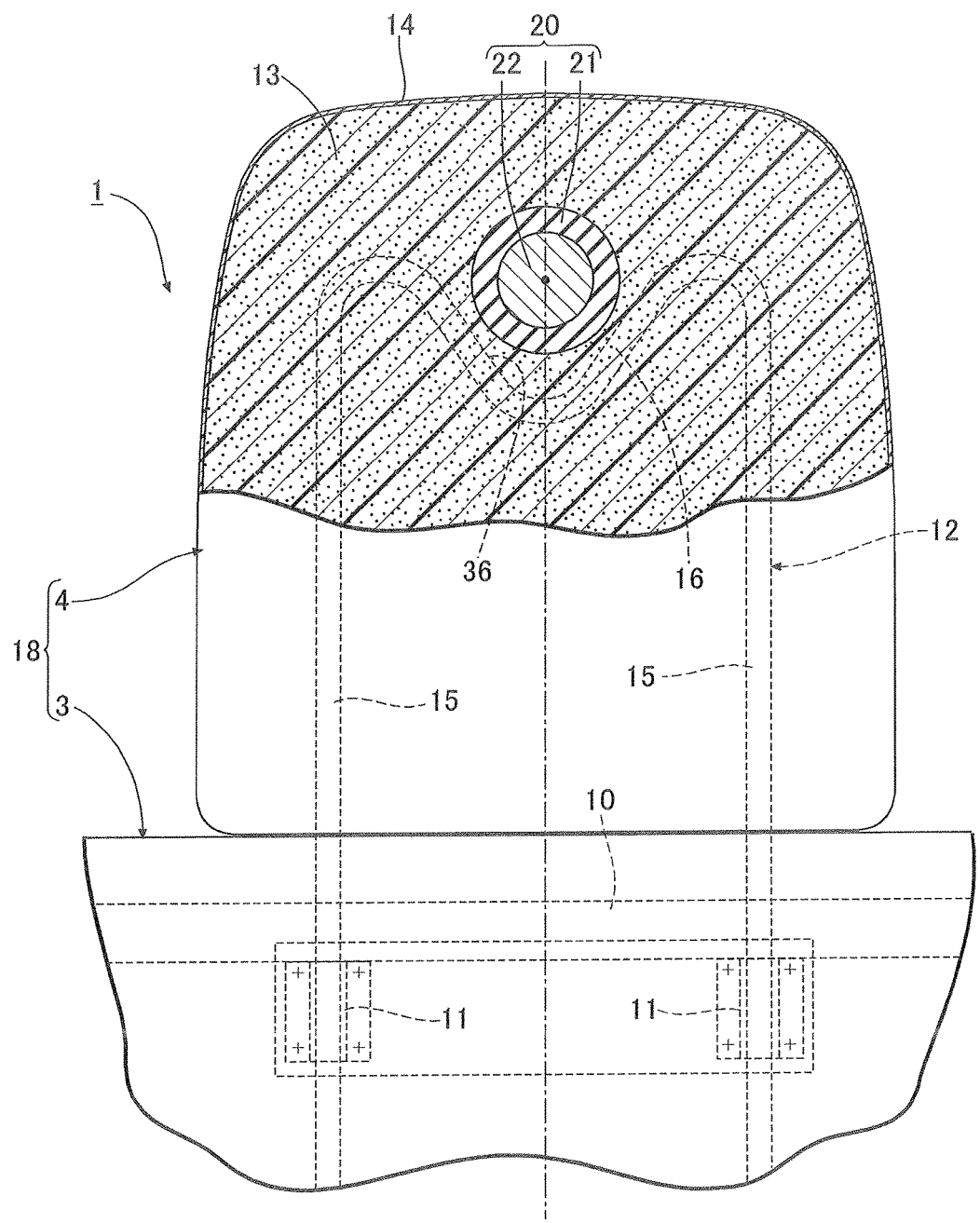
FIG. 8 is a sectional view along line 8-8 in FIG. 7. (third embodiment)

A third embodiment of the present invention shown in FIG. 7 and FIG. 8 is now explained.

Third Embodiment

In this third embodiment, a linking part 16 on an upper end part of a headrest frame 12 is formed so as to have a recess 36 in its central part, whereas a dynamic damper 20 is disposed so that part thereof enters the recess 36. The arrangement is otherwise the same as that of the first embodiment; parts in FIG. 7 and FIG. 8 corresponding to those in the first embodiment are denoted by the same reference numerals and symbols, and duplication of the explanation is omitted.

In accordance with this third embodiment, it becomes possible to place the dynamic damper 20 sufficiently close to the linking part 16 in the upper end part of the headrest frame 12, and it is possible to efficiently dispose the headrest frame 12 and the dynamic damper 20 in a thickness range that is limited in the fore-and-aft direction of the cushion member 13 of the headrest 4, thereby achieving a small size for the headrest 4.

Figure 9:
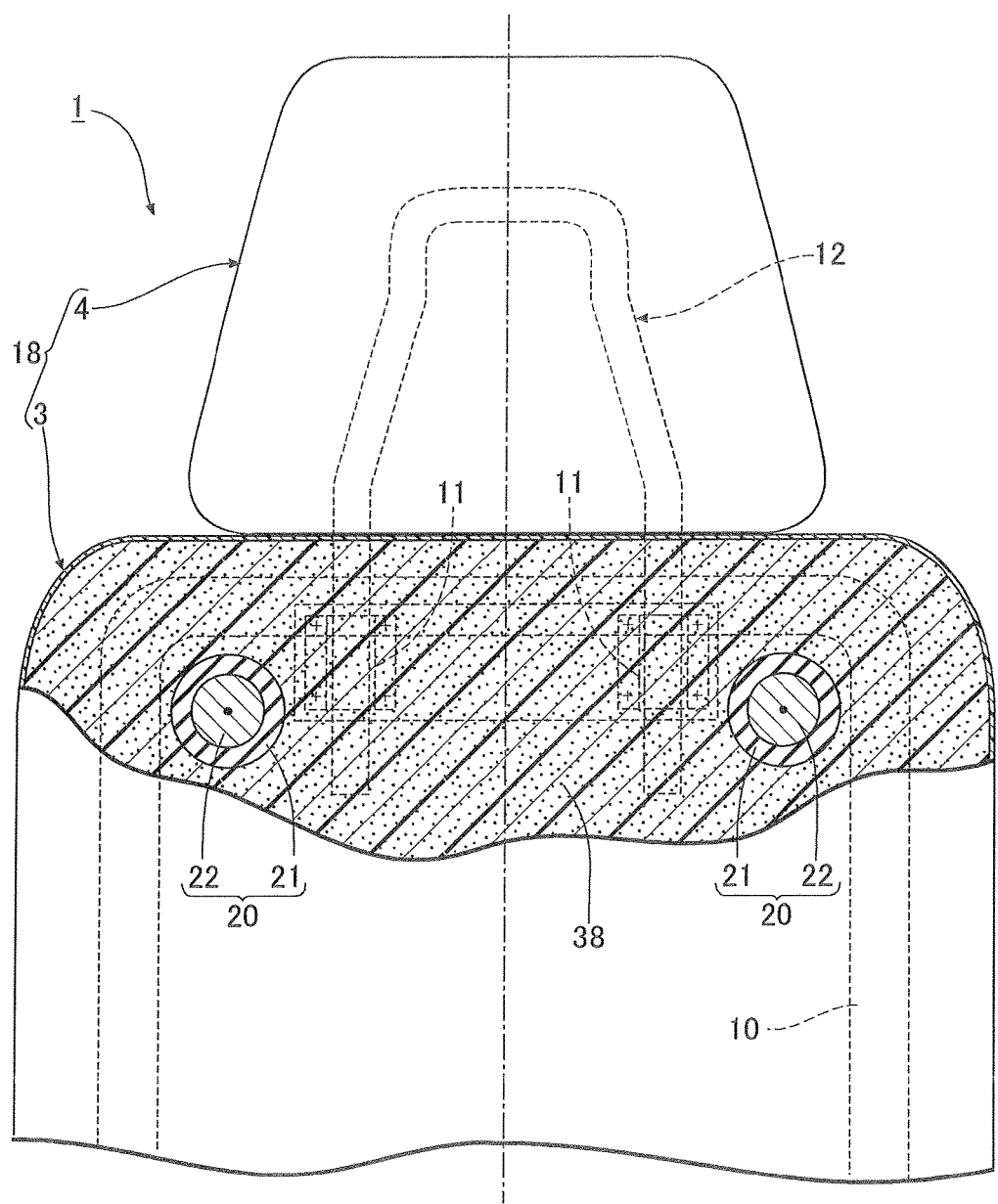
FIG. 9 is a front view of a part of a vehicle seat device showing a fourth embodiment of the present invention. (fourth embodiment)

A fourth embodiment of the present invention shown in FIG. 9 is now explained.

Fourth Embodiment

In this fourth embodiment, in a seat back 3, a pair of dynamic dampers 20 are embedded in left and right shoulder parts of a cushion member 13 supported by a seat back frame 10, and each dynamic damper 20 is formed, in the same manner as in the first embodiment, from an elastic member 21 and a weight 22 embedded therein. The arrangement is otherwise the same as that of the first embodiment; parts in FIG. 9 corresponding to those in the first embodiment are denoted by the same reference numerals and symbols, and duplication of the explanation is omitted.

In accordance with this fourth embodiment, the pair of dynamic dampers 20 and 20 embedded in the left and right shoulder parts of the cushion member 13 of the seat back 3 enable vibration of a vibration system 18 comprising the seat back 3 and a headrest 4 to be suppressed. Moreover, since the dynamic dampers 20 and 20, which are divided into a pair, are individually compact, they can be embedded compactly in the two shoulder parts of the seat back 3 so as not to affect the comfort of a seated driver.

Figure 10:
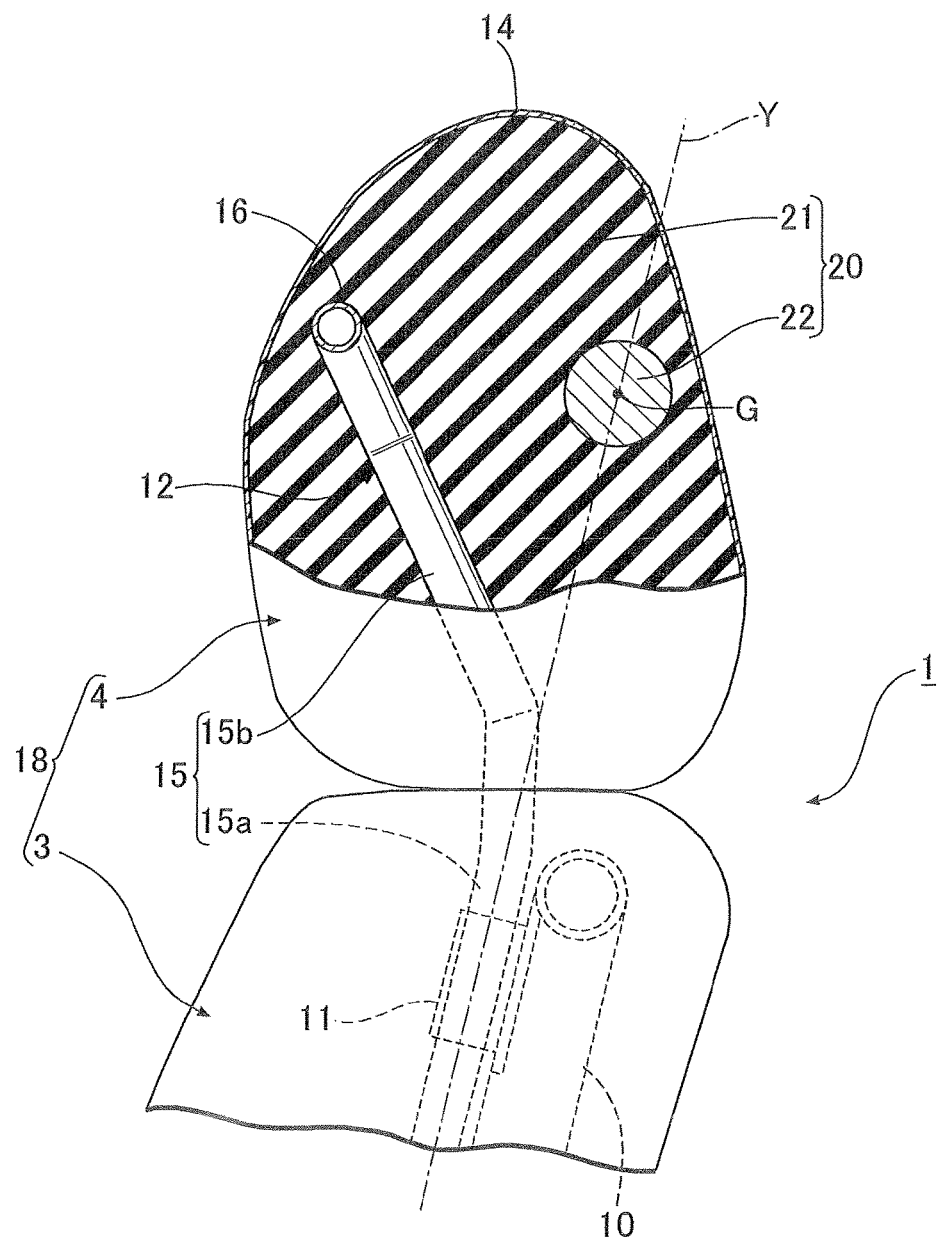
FIG. 10 is a view, corresponding to FIG. 2, of a fifth embodiment of the present invention. (fifth embodiment)

Finally, a fifth embodiment of the present invention shown in FIG. 10 is explained.

Fifth Embodiment

In this fifth embodiment, a dynamic damper 20 is formed from an elastic member 21 supported on a headrest frame 12 of a headrest 4 so as to wrap around it, and a weight 22 embedded in the elastic member 21. The elastic member 21 is made of a rubber or elastomer that is softer than a cushion member 38 of a seat back 3, and also functions as a cushion member of the headrest 4.

The arrangement is otherwise the same as that of the first embodiment; parts in FIG. 10 corresponding to those in the first embodiment are denoted by the same reference numerals and symbols, and duplication of the explanation is omitted.

In accordance with this fifth embodiment also, vibration of a vibration system 18, which includes the seat back 3 and the headrest 4, can be suppressed by means of resonance vibration of the weight 22 accompanied by elastic vibration of the elastic member 21. In this arrangement, since elastic vibration of the elastic member 21, which also functions as the cushion member of the headrest 4, occurs in part of an area around the weight 22, almost no vibration occurs on an outer surface portion with which a driver's head is in contact. Moreover, since the elastic member 21 of the dynamic damper 20 also functions as a cushion member of the headrest 4, the number of components can be cut accordingly, and the structure can be simplified.

The present invention is not limited to the above embodiments and may be modified in a variety of ways as long as the modifications do not depart from the spirit and scope thereof.

The invention claimed is:

1. A vehicle seat device comprising a seat cushion disposed on a floor of a vehicle, a seat back linked to a rear end part of the seat cushion, and a headrest fitted to an upper end part of the seat back, the seat back and the headrest cooperating to form a vibration system equipped with a dynamic damper, wherein:
the dynamic damper comprises an elastic member that is embedded within a cushion member of the vibration system, and a weight embedded in the elastic member,
the weight has a center of gravity which is offset upwardly or downwardly from a center of the cushion member,
the weight has an asymmetric shape in at least one of a lateral direction and an up-and-down direction, and
the headrest comprises
a headrest frame that is supported on a support tube so that the headrest frame can move up and down and be fixed, the support tube being fixedly provided on an upper end part of a seat back frame of the seat back, and
the cushion member that is supported on the headrest frame, the dynamic damper being embedded in the cushion member so that when viewed from a side, the weight is present on an extension axis of the support tube.

2. The vehicle seat device according to claim 1, wherein the vibration system further comprises a frame, and the dynamic damper is disposed so that part of the cushion member is present between the elastic member and the frame of the vibration system.

3. The vehicle seat device according to claim 2, wherein the dynamic damper is embedded in the cushion member of the headrest so that the center of gravity of the weight of the dynamic damper is present above a center in an up-and-down direction of the headrest.

4. A vehicle seat device comprising a seat cushion disposed on a floor of a vehicle, a seat back linked to a rear end part of the seat cushion, and a headrest fitted to an upper end part of the seat back, the seat back and the headrest cooperating to form a vibration system equipped with a dynamic damper, wherein:
the dynamic damper comprises an elastic member that is embedded within a cushion member of the vibration system, and a weight embedded in the elastic member,
the weight has a center of gravity which is offset upwardly or downwardly from a center of the cushion member,
the weight has an asymmetric shape in at least one of a lateral direction and an up-and-down direction,
the headrest comprises a headrest frame and the cushion member,
the headrest frame is formed from a frame lower portion supported on the support tube so that the frame lower portion can move up and down and be fixed, the support tube being fixedly provided on an upper end part of a seat back frame of the seat back, and a frame upper portion bending forward from an upper end of the frame lower portion and extending obliquely upward,
the cushion member is supported on the frame upper portion, and
the dynamic damper is embedded in the cushion member so as to be positioned to the rear of the frame upper portion.

5. A vehicle seat device comprising a seat cushion disposed on a floor of a vehicle, a seat back linked to a rear end part of the seat cushion, and a headrest fitted to an upper end part of the seat back, the seat back and the headrest cooperating to form a vibration system equipped with a dynamic damper, wherein:
the dynamic damper comprises an elastic member that is embedded within a cushion member of the vibration system, and a weight embedded in the elastic member,
the weight has a center of gravity which is offset upwardly or downwardly from a center of the cushion member,
the weight has an asymmetric shape in at least one of a lateral direction and an up-and-down direction, and
the dynamic damper is embedded as a pair in left and right shoulder parts of the cushion member of the seat back.

6. The vehicle seat device according to claim 1, wherein the weight of the dynamic damper is formed so that an upper half portion of the weight has a mass that is larger than a mass of a lower half portion.

7. The vehicle seat device according to claim 2, wherein the weight of the dynamic damper is formed so that an upper half portion of the weight has a mass that is larger than a mass of a lower half portion.

8. The vehicle seat device according to claim 3, wherein the weight of the dynamic damper is formed so that an upper half portion of the weight has a mass that is larger than a mass of a lower half portion.

9. A vehicle seat device comprising a seat cushion disposed on a floor of a vehicle, a seat back linked to a rear end part of the seat cushion, and a headrest fitted to an upper end part of the seat back, the seat back and the headrest cooperating to form a vibration system equipped with a dynamic damper, wherein:
the dynamic damper comprises an elastic member that is embedded within a cushion member of the vibration system, and a weight embedded in the elastic member,
the weight has a center of gravity which is offset upwardly or downwardly from a center of the cushion member, the weight has an asymmetric shape in at least one of a lateral direction and an up-and-down direction, and the elastic member of the dynamic damper is formed so that a spring constant thereof varies between that when the weight vibrates in a fore-and-aft direction of the vehicle and that when the weight vibrates in a left-and-right direction of the vehicle.

* * * * *

UNITED STATES PATENT AND TRADEMARK OFFICE
CERTIFICATE OF CORRECTION

PATENT NO. : 10,106,067 B2
APPLICATION NO. : 15/334685
DATED : October 23, 2018
INVENTOR(S) : Takuya Okubo Page 1 of 1

It is certified that error appears in the above-identified patent and that said Letters Patent is hereby corrected as shown below:

On the Title Page

Item (71):
Change "TS TECH CO., LTD" to -- TS TECH CO., LTD. --

Item (73):
Change "T.S. Tech Co., Ltd." to -- TS Tech Co., Ltd. --

Signed and Sealed this
First Day of January, 2019

Andrei Iancu
*Director of the United States Patent and Trademark Office*